(12) United States Patent
Chabanon et al.

(10) Patent No.: US 9,352,629 B2
(45) Date of Patent: May 31, 2016

(54) SPRING HAVING A BUILT-IN DEFORMATION SENSOR

(71) Applicant: RENAULT s.a.s., Boulogne-Billancourt (FR)

(72) Inventors: Christian Chabanon, Montigny-le-Bretonneux (FR); Anthony Jacques, Poissy (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 41 days.

(21) Appl. No.: 14/365,382

(22) PCT Filed: Dec. 10, 2012

(86) PCT No.: PCT/EP2012/074979
§ 371 (c)(1),
(2) Date: Jun. 13, 2014

(87) PCT Pub. No.: WO2013/087580
PCT Pub. Date: Jun. 20, 2013

(65) Prior Publication Data
US 2015/0033838 A1 Feb. 5, 2015

(30) Foreign Application Priority Data
Dec. 13, 2011 (FR) ..................................... 11 61585

(51) Int. Cl.
*B60G 11/14* (2006.01)
*F16F 1/366* (2006.01)
(Continued)

(52) U.S. Cl.
CPC ............... *B60G 11/14* (2013.01); *B60G 11/15* (2013.01); *F16F 1/3605* (2013.01); *F16F 1/368* (2013.01); *F16F 1/3665* (2013.01); *G01B 11/18* (2013.01); *G01D 5/35316* (2013.01);
(Continued)

(58) Field of Classification Search
CPC ............... B60G 11/14; B60G 2202/12; B60G 2202/143; B60G 2206/7101; B60G 2400/60; B60G 2401/144; G01D 5/35316; G01L 1/242; G01L 1/246; G01M 11/086; G01M 17/04
USPC ........................................................ 73/117.03
See application file for complete search history.

(56) References Cited

U.S. PATENT DOCUMENTS 5,126,558 A * 6/1992 Rogers, Jr. ............... H01J 40/14
250/227.16
5,633,494 A * 5/1997 Danisch ............. G02B 6/02057
250/227.14
(Continued)

FOREIGN PATENT DOCUMENTS

GB  2 421 075  6/2006
WO  94 24534  10/1994

OTHER PUBLICATIONS

Budan, D. A. et al., "Carbon Fiber Reinforced Composite Coil Springs", International Conference on Advances in Industrial and Production Engineering, pp. 17-21, (Nov. 15, 2011) XP055031378.

(Continued)

*Primary Examiner* — Freddie Kirkland, III
(74) *Attorney, Agent, or Firm* — Oblon, McClelland, Maier & Neustadt, L.L.P.

(57) ABSTRACT

A spring including a composite structure including reinforcement fibers in a matrix. The composite structure further includes at least one Bragg cell and at least one optical fiber connected to the Bragg cell.

14 Claims, 4 Drawing Sheets

(51) Int. Cl.
*F16F 1/368* (2006.01)
*G01D 5/353* (2006.01)
*G01B 11/16* (2006.01)
*G01L 1/24* (2006.01)
*G01M 11/08* (2006.01)
*B60G 11/15* (2006.01)
*G01G 19/08* (2006.01)
*F16F 1/36* (2006.01)
*G01M 17/04* (2006.01)

(52) U.S. Cl.
CPC .............. *G01G 19/08* (2013.01); *G01L 1/242* (2013.01); *G01L 1/246* (2013.01); *G01M 11/086* (2013.01); *G01M 17/04* (2013.01); *B60G 2202/12* (2013.01); *B60G 2202/143* (2013.01); *B60G 2204/12422* (2013.01); *B60G 2204/2022* (2013.01); *B60G 2206/426* (2013.01); *B60G 2206/7101* (2013.01); *B60G 2400/60* (2013.01); *B60G 2401/144* (2013.01); *G01D 5/35387* (2013.01)

(56) References Cited

U.S. PATENT DOCUMENTS

| | | | | |
|---|---|---|---|---|
| 6,039,311 A * | 3/2000 | Farnsworth | ............ | B60G 15/06 188/266.2 |
| 6,491,647 B1 * | 12/2002 | Bridger | ................... | A61B 5/021 128/900 |
| 7,083,199 B2 * | 8/2006 | Graber | ................... | B60G 7/001 280/5.507 |
| 8,386,127 B2 * | 2/2013 | Song | ...................... | B62K 21/08 180/227 |
| 9,109,883 B2 * | 8/2015 | Ansari | .................. | G01B 11/18 |
| 2004/0031911 A1 | 2/2004 | Hoffmann et al. | | |
| 2004/0154843 A1 * | 8/2004 | Aumer | ................... | B60N 2/002 177/165 |
| 2012/0069324 A1 * | 3/2012 | Ansari | .................. | G01B 11/18 356/32 |
| 2014/0046502 A1 * | 2/2014 | Schmitt | ................. | B60G 11/00 701/1 |
| 2015/0115848 A1 * | 4/2015 | McFadden | ............. | H02P 25/06 318/135 |

OTHER PUBLICATIONS

International Search Report Issued Feb. 1, 2013 in PCT/EP12/074979 Filed Dec. 10, 2012.

French Search Report Issued Jul. 12, 2012 in French Application No. FR 11 61585 Filed Dec. 13, 2011.

\* cited by examiner

SPRING HAVING A BUILT-IN DEFORMATION SENSOR

BACKGROUND

The invention relates to an intelligent spring. More particularly, the subject of the present invention is a spring equipped with a deformation sensor for measuring a load on a wheel of a vehicle. This type of spring has many applications in the field of vehicles. Knowing the load being applied to the wheels of a vehicle constitutes input data that can be used for controlling the suspension, for matching the computer-controlled electro-stabilizer, for optimizing the braking, or even for warning the user of a vehicle in the case of an overload.

In this field, means are already known that allow the load being applied to a wheel of a vehicle to be estimated. These means consist of devices of the deformation gauge type, also usually referred to as strain gauges.

The aim of this gauge is to translate the deformation of a component into a variation in electrical resistance: the more the strain gauge is stretched, the higher the resistance.

This gauge is bonded onto the spring. Thus, when strain forces are applied to the spring, a variation in the value of the resistance will be measured subsequently allowing the variation in length to be deduced from this value. Using the variation of the length, it is then possible to deduce the strain being exerted on the spring and thus to deduce from this the force being exerted on the spring. The load being exerted on the wheel of the vehicle is deduced from this.

The conditions of use of such gauges have several drawbacks.

Since it is bonded onto the support, this being the spring, the strain gauge is disadvantageously subjected to the environmental conditions of the vehicle.

More precisely, the test body defining the part that will undergo the deformations is composed of a material for which it is difficult to find a compromise. For example, certain steel alloys offer a good measurement precision and an excellent resistance to fatigue but are vulnerable to corrosion. In contrast, stainless steel exhibits a good resistance to corrosion but it is less homogeneous and is hence less precise.

Furthermore, the gauge is subjected to other undesirable effects such as thermoelectric effects linked to the difference in temperature between two connection points of the gauge.

Another undesirable effect that strain gauges exhibit is a hysteresis phenomenon, in other words the information that the gauge delivers is different depending on whether the measurements are under an increasing or decreasing load. At the present time, it is not possible to compensate for this with the measurement electronics. This phenomenon is notably dependent on the material composing the strain gauges.

Another drawback characterizing this type of measurement solution is that the information delivered at the output is not always proportional to the input value, which is detrimental to the quality of the measurement.

BRIEF SUMMARY

The aim of the invention is to overcome at least a part of these drawbacks, notably to protect the means for measuring the load from attack from the external environment and to reinforce the quality of the measurement by providing a known spring, of the type comprising a composite structure comprising reinforcement fibers within a matrix, which is differentiated in that the composite structure comprises at least one Bragg cell and at least one optical fiber connected to the Bragg cell.

The configuration of an optical fiber connected to one or more Bragg cells offers a solution for the measurement of the load of a vehicle on its various wheels.

In order to estimate the vertical load applied to a vehicle, the targeted solution consists of the measurement of the load by estimating the strains occurring at the location of the spring. The idea is therefore to find a strain sensor designed for a spring. This type of measurement will only be possible when the shock absorbers are not transferring forces and the vertical speed of the suspension members is zero, so as to estimate the load solely on the basis of the data coming from the spring.

Furthermore, it is particularly advantageous for the optical fiber with Bragg cell(s) to be included in the composite structure. In this way, the optical fiber is incorporated with the other fibers, and notably the reinforcement fibers.

Thus, the optical fiber and the Bragg cell(s) are insensitive to attack from the external environment from water, oil, various projections, electrochemical corrosion, acid used in automatic car wash stations. Indeed, the optical fiber and the Bragg cells are protected by the envelope of the spring.

Another advantage is that the optical fiber and the Bragg cells are insensitive to electromagnetic interference.

Furthermore, Bragg cells exhibit a very good stability over time. The measurement of the deformations is independent of the intensity of the light signal and of the curvature of the fibers.

Advantageously, strain gauges formed by an optical fiber connected to one or more Bragg cell(s) allows the sensors to be operated over a relatively wide temperature range between $-40°$ C. and $50°$ C., while at the same time maintaining the measurement precision over all of the temperatures included within the aforementioned range.

Another advantage offered by the present solution is that it is possible to integrate the optical fiber and the Bragg cell(s) into one or more regions of the spring in such a manner as to allow the reconstruction of the static load on a vehicle.

Such a solution may be integrated into any type of spring. This therefore allows the professional design rules for a spring to be conserved—without causing any additional design effort.

In addition, the optical fiber connected to Bragg cells operates with the various geometries of the spring. The diameter of the optical fiber is greater than 20 mm which is easily compatible with the winding diameters of the spring measuring around 150 mm.

Another advantage is that this solution offers a reduced cost since the spring lasts for the lifetime of the vehicle.

The weight of the optical fiber and of the Bragg cells is negligible with respect to the weight of the spring. Thus, the weight of the strain sensors formed notably by the optical fiber and the Bragg cells does not increase the mass of the spring.

Another advantage provided by the present solution is the existence of a single fiber for all of the measurements. Thus, the targeted solution reduces the space used in the wheel arches.

Advantageously, the presence of this sensor on the spring allows the mechanical monitoring of the component. This solution is applicable on the suspensions of all types of vehicle, without having to redesign all the wheel sets of the vehicles or the specific tooling within the factories.

Furthermore, there is no electronics installed on the body of the spring, a fact which simplifies the tests, the precautions of use for the workers, the precautions of use for the equipment on production lines, and the precautions for installation of the suspension members onto the automobiles.

According to one particular embodiment, the spring is helicoidal and comprises a wire wound in a spiral about a first axis, said wire having a substantially circular cross-section and extending along a second axis of the composite structure within which the optical fiber is oriented in the direction defined by the reinforcement fibers.

In this way, the arrangement of the optical fiber within the composite structure limits the alteration of the mechanical properties of the structure.

According to another particular embodiment, the spring has a longitudinal axis and comprises platelets extending substantially along the longitudinal axis and the optical fiber runs longitudinally within at least one of them.

Such an arrangement advantageously allows the deformations of the platelet to be sensed in the main direction defined by the platelet.

According to one particular embodiment where the spring is helicoidal, the optical fiber is adjacent to an external contour of the wire.

The proportion of the strain force felt by the optical fiber connected to the Bragg cell is proportional to the radial distance to the neutral fiber, which defines the fiber in the center of the wire. This advantageously allows the sensitivity of the measurement of the stresses being exerted on the spring to be improved.

According to another particular embodiment, a first and a second Bragg cell are arranged, the second cell being arranged with respect to the first cell at a distance substantially equivalent to the distance covered by the optical fiber when it forms a half-revolution around the second axis (B) of the wire.

The positioning of the Bragg cell may give rise to a dispersion phenomenon. The configuration of two Bragg cells such as the above-mentioned allows this phenomenon to be partially or completely cancelled. Indeed, the average of the stresses measured by these two cells will be constant, irrespective of the dispersion.

According to another particular embodiment, a first cell and a second cell are arranged longitudinally, each respectively disposed on either side of a point (M) of maximum bending moment, the first and second cell defining distances with the point (M) of maximum bending moment substantially equal to one another and defining a controlled distance D between them.

According to another particular embodiment of the invention, a first cell and a second cell are arranged longitudinally, each respectively disposed on either side of a point defining the middle of the platelet along the longitudinal axis (X), the first and second cell defining distances with the point defining the middle of the platelet substantially equal to one another and defining between them a controlled distance D.

Such an arrangement allows the dispersion on the relative positioning of the Bragg cells to be wholly or partially overcome. The distance must be chosen such that, when the spring is mounted on the vehicle, it is large enough to guarantee this respective positioning on either side of the point of maximum bending moment depending on the dispersion, but as small as possible in order to be positioned within the regions under the highest strain. This advantageously allows the precision of the sensor to be improved.

According to one particular embodiment, the reinforcement fibers are inclined at an angle $\alpha$ with respect to the second axis, said angle $\alpha$ being in the range between 30° and 50°, preferably 44° on the usual designs of automobile springs.

Such an arrangement advantageously allows the reinforcement fibers to be made to work in tension-compression when the spring is helicoidal.

Furthermore, it may be envisioned to incline the reinforcement fibers as a function of the winding angle of the coils of the spring. This notably depends on the diameter of the spring and on the number of coils composing the spring. Taking these data into account, it is possible to optimize the braiding angle of the fibers, including the optical fiber, in order to optimize the stresses being exerted on the spring along its wire axis. According to one particular embodiment, where the spring is a leaf spring, the reinforcement fibers are unidirectional.

This advantageously allows the mechanical properties of the material to be improved.

According to a second subject of the invention, a device for measuring a load on at least one wheel of a vehicle is also provided, the device comprising:
  a spring such as previously defined, designed to be mounted onto said wheel;
  a source module designed to emit light signals toward the Bragg cell(s) of the spring;
  a receiver module, also called interrogator, designed to receive signals transmitted by the Bragg cell or cells and to convert them into output data;
  a processor module capable of processing said output data and of calculating the load on the wheel equipped with the spring.

The advantage of this type of device is the ability to locate the various electronic modules remotely from the measurement points. Thus, it is possible to place the various modules according to the space available in the vehicle. Furthermore, this allows the installation procedure for the device to be facilitated. The receiver module can successively interrogate each spring of a vehicle composed of one or more Bragg arrays that are identical from an optical point of view. This feature of the interrogator provides a significant gain in the cost of the receiver module/sensor pair.

In addition, it is possible to carry out the detection in two ways: by detection in reflection or by detection in transmission. In the first case, the light signal is sent back to the source, and the source module can therefore also be the receiver module. In the second case, the light signal is sent to the receiver module.

It should be pointed out that, in the case of integration on an automobile spring, it will be more advantageous to operate in reflection analysis mode, so as to facilitate the integration of the optical fiber and to reduce the space required.

According to a third subject of the invention, a method for measuring a load on at least one wheel of a vehicle is also provided, the method comprising the following steps:
  a) at least one optical fiber with Bragg cell(s) forming a sensor for measuring the deformations, and
  comprising one or more Bragg cell(s), is installed in a spring;
  b) a source module emits light signals towards each Bragg cell;
  c) each Bragg cell returns a light signal to a receiver module;
  d) the receiver module converts the light signals into output data and transmits it to a processor module;
  e) the processor module processes the output data and calculates the load on the wheel equipped with the spring.

According to a fourth subject of the invention, a vehicle is also provided equipped for its traction with a wheel comprising a spring such as targeted by the present application.

All the aforementioned features may be combined in part or as a whole.

BRIEF DESCRIPTION OF THE DRAWINGS

Other features and advantages will become clearly apparent from the description presented hereinafter, by way of non-limiting example, with reference to the appended drawings, in which.

DETAILED DESCRIPTION

Figure 1:
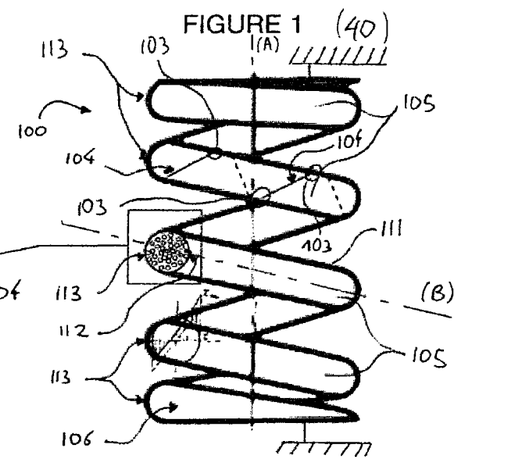
FIG. 1 shows schematically a simple composite helicoidal spring comprising an optical fiber connected to Bragg cells.
Figure 2:
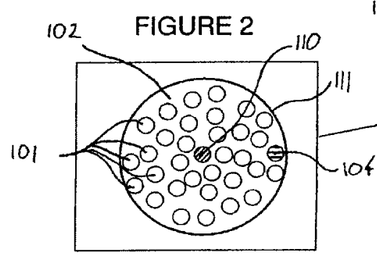
FIG. 2 shows a transverse cross-sectional view of the wire of the preceding composite helicoidal spring.
Figure 3:
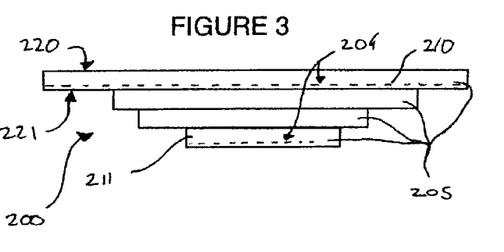
FIG. 3 shows schematically a simple composite leaf spring comprising an optical fiber connected to Bragg cells.

In FIGS. 1 and 2, then FIG. 3, two different mechanical springs are respectively shown: a helicoidal spring 100 and a leaf spring 200.

These springs 100, 200 comprise a composite structure comprising reinforcement fibers 101 (FIG. 1), 201 (not shown) within a matrix 102 (FIG. 1), 202 (not shown). By way of example, the document FR2837250 shows a helicoidal spring and its method of manufacture.

The composite structure furthermore comprises at least one Bragg cell 103, 203 and at least one optical fiber 104, 204 connected to the Bragg cell 103, 203.

The principle of a Bragg cell 103, 203 is to arrange deformation sensors in various regions of the optical fiber 104, 204. The optical 104, 204 with Bragg cells 103, 203 is particularly well adapted to composite materials since it can be incorporated with the other fibers.

The interrogation of each Bragg cell 103, 203 is carried out notably by means of light signals of different wavelengths. Each Bragg cell 103, 203 modifies the light that corresponds to it and returns a light signal modified by the deformation imposed on the optical fiber 104, 204. The returned light signal is measured by an optical receiver. Depending on the measurement and demultiplexing techniques employed, the number of sensors per optical fiber 104,204 can vary from 1 to around 100.

The Bragg cell 103, 203 causes a periodic or aperiodic perturbation of the effective coefficient of absorption or of the effective index of refraction of an optical guide. In other words, the Bragg cell 103, 203 reflects a predetermined waveband—wide or narrow—of the light beam while at the same time allowing the other bands to pass through.

In order to photo-imprint a Bragg cell 103, 203 into an optical fiber 104, 204, photosensitive glass is used. The Bragg cell 103, 203 is photosensitive. Its photosensitivity results from the exposure of the optical fiber 104, 204 to ultraviolet radiation from a laser. This exposure modifies the index of refraction in the core of the optical fiber 104, 204.

By intense irradiation of the optical fiber 104, 204, with a periodic or aperiodic distribution of the radiation, the index of refraction inside of the optical fiber 104, 204 is permanently modified. Thus, this irradiation gives rise to the photo-impression of a Bragg cell 103, 203, at a predetermined index of refraction, in the optical fiber 104, 204 (see FIG. 8).

Figure 8:
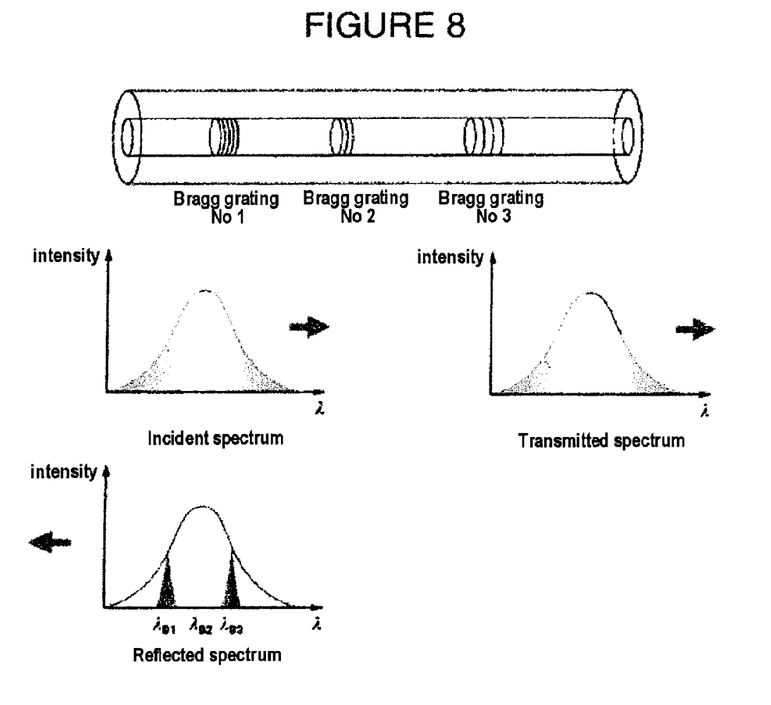
FIG. 8 shows the general concept of an optical fiber connected to Bragg cells

The Bragg cell 103, 203 therefore becomes a very selective spatial reflector. As can be seen in FIG. 8, any modification of the period or of the index of refraction of the Bragg cell 103, 203 leads to a proportional shift of the reflected and transmitted spectrum, together with a modification of the spectral profile of the light signal. Therefore, either the amplitude of the maximum peak or the modification of the spectral profile may be measured by comparing the profile of the Bragg cell subjected to the stress with that without stress.

Bragg cells 103, 203 allow the low-cost fabrication of optical instruments only operating over the selected wavelengths. They nevertheless exhibit high precision qualities.

FIG. 1 shows schematically a helicoidal compression spring 100, conventionally disposed between a body 40 of a vehicle and a support 50 of a wheel 60 of a vehicle. This spring 100 is compressed in order to absorb the shocks due to the irregularities of the ground over which the vehicle is being driven.

When the spring 100 is subjected to a load F1 so as to be compressed down to a length L1, this load is calculated according to the following equation: $F1=k(L0-L1)$ where F1 is the load under a length L1, L0 is the free length in the non-compressed state of the spring and k is the stiffness of the spring.

The spring 100 such as shown in FIG. 1 has an assembly of coils 105. This assembly of coils 105 is preferably formed starting from a rod or from a wire 106 made of composite material with a circular or oval cross-section.

FIG. 2 shows that the spring 100 comprises a composite structure comprising reinforcement fibers 101 within a matrix 102.

The wire 106 starting from which the assembly of coils 105 is formed comprises reinforcement fibers 101 preferably made of glass or of carbon, a binder matrix 102 preferably composed of epoxy or polyester, a neutral fiber 110 at the location of the center of the coil 105, and an optical fiber 104 connected to Bragg cells 103. Since it is in the center of the coil 105, the neutral fiber 110 should, in theory, not see any stress.

In FIG. 1, the spring 100 is helicoidal and comprises a wire 106 wound in a spiral around a first axis (A). The wire 106 has a substantially circular cross-section and runs along a second axis (B) of the, preferably solid, composite structure. The first axis (A) defines the usual axis around which the wire 106 defines a helicoidal path, and the second axis (B) defines the axis extending longitudinally along the center of the wire 106.

Furthermore, as shown schematically in FIG. 1, the helicoidal spring 100 has a composite structure within which the optical fiber 104 is oriented in the direction defined by the reinforcement fibers 101.

According to one particular embodiment, the reinforcement fibers 101 are unidirectional. In another embodiment, the reinforcement fibers can be crossed by layer, such as for example a first layer of reinforcement fiber oriented at +45° with respect to an axis, and a second layer oriented at −45° with respect to this same axis.

In the case of a composite spring 100, the fibers 101 forming the spring 100 are placed with an angle of around 45° with respect to the axis (B) of the wire of spring 100. The fibers 104 then work in tension-compression. In the same way, the optical fiber 104 with Bragg cells 103 is placed with an angle substantially equal to that defined by the reinforcement fibers 101 with respect to the axis (B) of the spring 100, in order for it to also be subjected to a maximum tension-compression stress.

A more precise analysis allows the braiding angle of the reinforcement and optical fibers to be optimized, and notably the distribution of the stress along the axis (B) of the spring to be optimized. By way of example, for conventional springs of private vehicles, the optimum angle is situated around 44°.

According to one particular embodiment, in the helicoidal spring 100, the reinforcement fibers 101 are inclined at an angle α with respect to the second axis, said angle α being in the range between 30 and 50°, preferably 44°.

The integration of an optical fiber 104 into the wire 106 of a helicoidal spring 100 is important, and notably with respect to the sensitivity of the measurement.

Advantageously, as can be seen in FIG. 2, the optical fiber 104 is adjacent to an external contour 111 of the wire.

Indeed, the proportion of strain force experienced by the optical fiber 104, and hence the sensitivity of the measurement, is proportional to the radial distance to the neutral fiber. Furthermore, as depicted in FIG. 1, the maximum stresses take place in the neighborhood of an internal side 112 of the spring 100, in other words the portion of the contour 111 nearest to the axis (A). The spring has an external side 113, opposite to the internal side 112, defining the portion of the contour ill the furthest away from the axis (A).

According to one particular embodiment of FIG. 1, at least two Bragg cells 103 are arranged in the helicoidal spring 100, a first cell 103 and a second cell 103, which is arranged at a distance substantially equivalent to the distance covered by the optical fiber 104 when it forms a half-revolution about the second axis (B) of the wire 106.

Preferably, these two Bragg cells 103 at the location where the strain forces are maximum are halfway between the external side 113 and the internal side 112 of the spring 100. The distance separating the two Bragg cells 103 should preferably be equal to:

$$D = \frac{df}{2} \times \sqrt{\pi^2 + 4 \cdot \tan(\beta)^2},$$

with β the winding angle of the fiber 104 with respect to the wire 106 of the spring 100 and df the mounting diameter of the optical fiber 104. The mounting diameter of the optical fiber 104 is relative to the center of the wire 106 of the spring 100. In other words, along a transverse cross-section of the wire 106 as shown in FIG. 2, the distance separating the optical fiber 104 from the center of the wire 106 corresponds to a mounting radius of the optical fiber 104.

FIG. 3 shows a leaf spring 200. The leaf spring 200 has a longitudinal axis (X) and comprises platelets 205 extending substantially along the longitudinal axis (X) (see FIGS. 4 and 5). Within at least one of them (the platelets 205), the optical fiber (204) runs longitudinally.

In another particular embodiment, the optical fiber extends into all the platelets (205).

Figure 5:
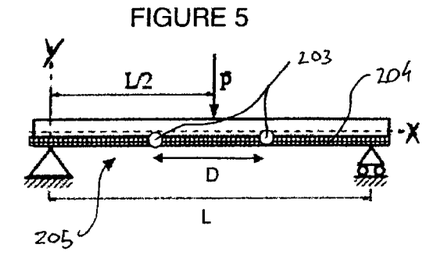
FIG. 5 shows the general disposition of the Bragg cells within the leaf spring.

As can be seen in FIG. 5, the leaf spring 200 may be considered as equivalent to a beam of active length L, of thickness e and of width B, subjected to a load P.

Figure 4:
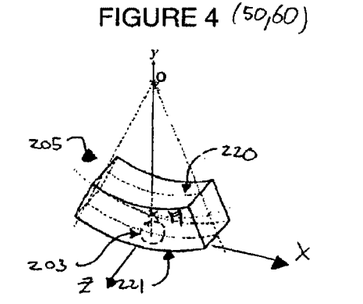
FIG. 4 shows a perspective view of a platelet of a leaf spring subjected to a bending moment along an axis Z.
Figure 6:
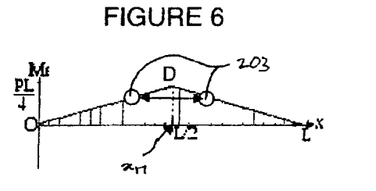
FIG. 6 shows a diagram of the forces from the bending moment being exerted on the platelet according to FIG. 4 as a function of the abscissa X.

When the spring 200 is subjected to a load P, the platelet 205 is subjected to a bending moment Mfz. Conventionally, as shown in FIGS. 4 and 6, this moment is maximum at the center of the platelet 205. The bending stress is therefore maximum at the center of the platelet and is equal to Mfzmax=PL/4.

In the plane (XOY), the fibers 201 are concentric, the bending center O being situated at the top.

It is known that the stress normal to the cross-section varies linearly as a function of y and is therefore maximum at the edge of a platelet 205, in tension at the bottom, and in compression at the top.

$$\sigma_{xx} = \frac{M_{fx}}{I_z} \times y$$

where $I_z$ is the second moment of area along the axis Z calculated as a function of the shape of the right cross-section.

In the case of a rectangular platelet cross-section:

$$I_z = \frac{Be^3}{12}$$

The maximum strain in tension/compression within the fiber 204 will therefore be:

$$\sigma_{xxmax} = \frac{3PL}{2Be^2}$$

In such a manner as to overcome the dispersion on the relative positioning of the Bragg cell 203, in one embodiment of the invention, a first cell (203) and a second cell (203) are arranged with each respectively disposed on either side of a point (M) of maximum bending moment, the first and second cell (203) defining distances with the point (M) of maximum bending moment substantially equal to one another and defining between them a controlled distance D. Typically, the first and second cell are each respectively disposed on either side of a point defining the middle of a platelet (205) along the longitudinal axis (X).

The distance D must be chosen to be large enough to guarantee this positioning on either side of the point of maximum bending moment depending on the dispersion of D but as small as possible so as to be positioned in the region with the highest stresses and hence allowing the sensor to be as precise as possible.

The average strain measured will then be equal to:

$$\sigma_{xx\_mesure\_Bragg} = \frac{3P(L - D)}{2Be^2}$$

The Bragg cells 203 should preferably be placed on the platelets 205 which measure the greatest deformations. More precisely, as shown in FIG. 3, the leaf spring comprises a top platelet 210 and a bottom platelet 211 and intermediate platelets 212. In one preferred embodiment, only the top platelets 210 and bottom platelets 211 are equipped with Bragg cells 203.

Preferably, the Bragg cells 203 are arranged in the leaf spring 200 in such a manner that the Bragg cells 203 run at the location where the strain forces are maximum. Thus, it is particularly advantageous for the Bragg cells 203 to be disposed within the spring 200 in the plane (YZ) passing through the point O and intersecting the platelet 205 in a transverse direction at its middle. Furthermore, they may be arranged in the neighborhood of a lower face 221 or of an upper face 220 of the platelet.

According to a second subject of the invention is aimed at a device 1 for measuring a load on at least one wheel (60) of a vehicle, the device comprising:
 a. a spring 100, 200 such as defined in the present description, mounted on said wheel (60);
 b. a source module 10 designed to emit light signals towards each Bragg cell 103, 203 of the spring 100, 200;
 c. a receiver module 20 designed to receive signals transmitted by the Bragg cells and to convert them into output data;
 d. a processor module 30 capable of processing said output data and of calculating the load on the wheel (60) equipped with the spring 100, 200.

Figure 7:
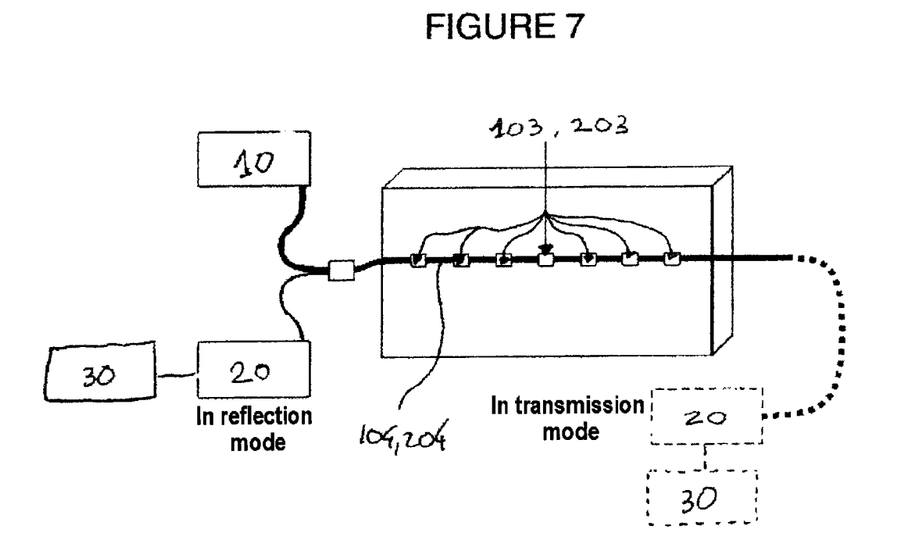
FIG. 7 shows a schematic diagram of the configuration architecture of the Bragg cell sensor.

As shown in FIG. 7, this type of sensor has the advantage of being able to locate the electronic modules, consisting of the source module 10, the receiver module and the processor module 30, remotely from the measurement points.

It is possible to carry out the detection in two ways: by reflection by means of a source module 10 also forming receiver means 20, or by reception by means of a source module 10 and of a receiver module 20 separate from the source module 10.

Figure 9:
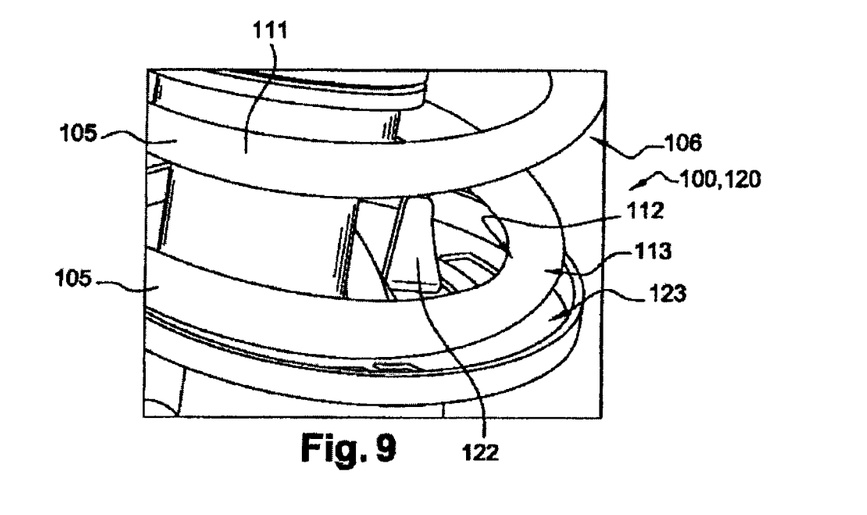
FIG. 9 shows the passage of the optical fiber through the lower part of the spring.
Figure 10A:
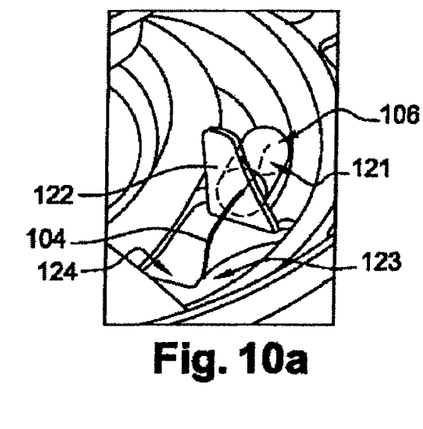
FIG. 10a shows the exit of the optical fiber from the wire of the spring, with an indexing tab adapted to allow the optical fiber to exit freely.
Figure 10B:
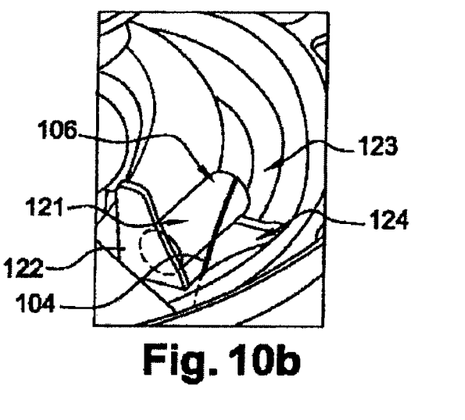
FIG. 10b is an analogous view showing one variant of the exit of the optical fiber from the spring according to which the folding of the tab is reversed so as to make the fiber exit prematurely and to make it pass through the cavity hole of the tab.
Figure 11:
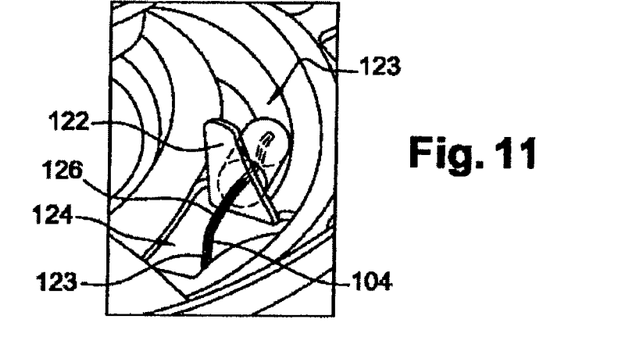
FIG. 11 shows the optical fiber protected by a sheath at the location of the exit end from the wire of the spring.
Figure 12:
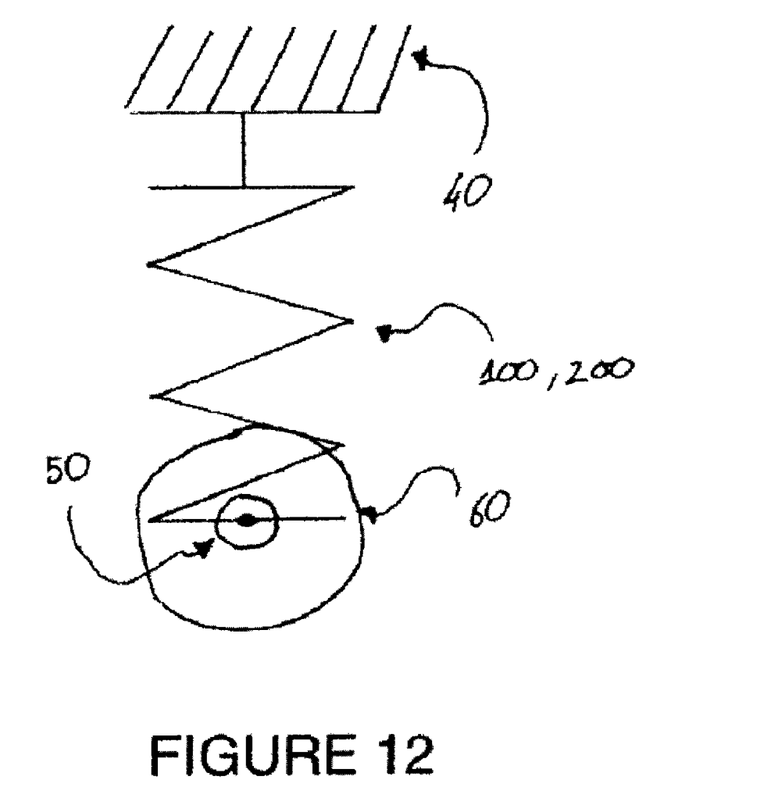
FIG. 12 shows a spring according to any one of the embodiments comprised between the spring support and the body of the vehicle.

In FIGS. 9 to 11, the various ways of arranging the optical fiber 104 connected to Bragg cells 103, within a helicoidal spring 100, is considered.

By way of example, the optical fiber 104 can be arranged in such a manner that it passes through the bottom part 120 of the spring 100.

FIG. 10a shows that the optical fiber 104 has an output end 121 which is positioned in such a manner as to conform to the shape of an angular indexing tab 122 of a dished support plate 123 for the spring, and in such a manner that the output end 121 of the fiber 104 can freely extend outside of the wire 106 of the spring 100.

It may also be envisioned to modify the shape of the indexing tab 122 in such a manner that the output end 121 of the fiber 104 can freely extend outside the wire 106 of the spring 100.

Furthermore, the optical fiber 104 can then run over the fixing lug for the wheel speed sensor or for the flexible brake pipe.

As shown in FIG. 10b, another alternative can consist in reversing the folding direction of the angular indexing tab 122 such that the optical fiber 104, exiting prematurely from the wire 106, can pass through a cavity hole 124 of the indexing tab 122.

It may also be envisaged to make the optical fiber 104 pass through the top part (not shown) of the spring 100. The fiber 104 then runs over the outside of the dished support plate so as not to put a hole in the filtering block.

Once it has exited from the wire 106 of the spring 100, the optical fiber 104 is preferably protected by means of a protective sheath 126 (see FIG. 11). The protective sheath 126 can be at the location of the end 121 of the spring in order to ensure a sufficient mechanical stability of the assembly defined by the optical fiber 104 accompanied by its protective sheath 126. A portion of the optical fiber extending toward the outside of the wire 106, near to the output end 121, is then completely protected.

A third subject of the invention is aimed at a method for measuring a load on at least one wheel (60) of a vehicle, the method comprising the following steps:
 a) at least one optical fiber 104, 204 with Bragg cells 103, 203, forming a sensor for measuring deformations and comprising Bragg cells 103, 203, is installed in a spring 100, 200;
 b) a source module 10 emits light signals toward each Bragg cell 103,203;
 c) each Bragg cell 103, 203 returns a light signal to a receiver module 20;
 d) the receiver module 20 converts the light signals into output data and transmits it to a processor module 30;
 e) the processor module 30 processes the output data and calculates the load on the wheel (60) equipped with the spring.

The invention claimed is:

1. A spring comprising:
 a composite structure comprising reinforcement fibers within a matrix,
 wherein the composite structure comprises at least one optical fiber positioned within the matrix of the spring and at least one Bragg cell, the optical fiber being connected to the Bragg cell.

2. The spring as claimed in claim 1, wherein the spring has a helicoidal shape and comprises a wire formed of the composite structure and wound in a spiral around a first axis to form the helicoidal shape, the wire having a substantially circular cross-section and extending along a second axis of the composite structure, wherein the optical fiber is within the wire and oriented in a direction defined by the reinforcement fibers.

3. The spring as claimed in claim 2, wherein the optical fiber is adjacent to an external contour of the wire.

4. The spring as claimed in claim 2, wherein the at least one Bragg cell includes a first Bragg cell and a second Bragg cell, the second Bragg cell being arranged with respect to the first Bragg cell at a distance substantially equivalent to a distance covered by the optical fiber when the optional fiber forms a half-revolution about the second axis of the wire.

5. The spring as claimed in claim 2, wherein the reinforcement fibers are inclined at an angle with respect to the second axis, the angle being in a range of 30° to 50°.

6. The spring as claimed in claim 2, wherein the reinforcement fibers are unidirectional.

7. The spring as claimed in claim 2, wherein the optical fiber includes an output end that extends out of a bottom end of the wire of the spring.

8. The spring as claimed in claim 2, wherein the optical fiber includes an output end that extends out of the wire of the spring before a bottom end of the wire.

9. The spring as claimed in claim 1, wherein the spring has a longitudinal axis and comprises platelets extending substantially along the longitudinal axis and within at least one of them the optical fiber runs longitudinally.

10. The spring as claimed in claim 9, wherein the at least one Bragg cell includes a first Bragg cell and a second Bragg cell arranged longitudinally, each respectively disposed on either side of a point of maximum bending moment, the first and second Bragg cells defining distances with a point of maximum bending moment substantially equal to one another and defining between them a controlled distance.

11. The spring as claimed in claim 9, wherein the at least one Bragg cell includes a first Bragg cell and a second Bragg cell arranged longitudinally, each respectively disposed on either side of a point defining a middle of the platelet along the longitudinal axis, the first and second Bragg cells defining distances with a point defining a middle of the platelet substantially equal to one another and defining between them a controlled distance D.

12. A device for measuring a load on at least one wheel of a vehicle, the device comprising:
- a shock absorber device for the wheel comprising a spring as claimed in claim 1, configured to be mounted onto the wheel;
- a source module configured to emit light signals toward the Bragg cell of the spring;
- a receiver module configured to receive signals transmitted by the Bragg cell and to convert the signals into output data; and
- a processor module configured to process output data and to calculate a load on the wheel including the spring.

13. A vehicle including for its traction a wheel, comprising a spring as claimed in claim 1.

14. A method for measuring a load on at least one wheel of a vehicle, the method comprising:
- installing at least one optical fiber with Bragg cells, forming a sensor for measuring deformations and comprising the Bragg cells, in a spring, the spring including a composite structure comprising reinforcement fibers within a matrix, the optical fiber being positioned within the matrix of the spring;
- emitting, by a source module, tight signals toward each Bragg cell;
- each Bragg cell returning a light signal to a receiver module;
- converting, at the receiver module, the light signals into output data and transmits the output data to a processor module; and
- processing, at the processor module, the output data and calculating the toad on the wheel equipped with the spring.

* * * * *